Feb. 6, 1934.                F. E. RILEY                1,946,235
                    LUBRICATED VALVE AND CONTROL SYSTEM
                    Filed June 23, 1931          2 Sheets-Sheet 1
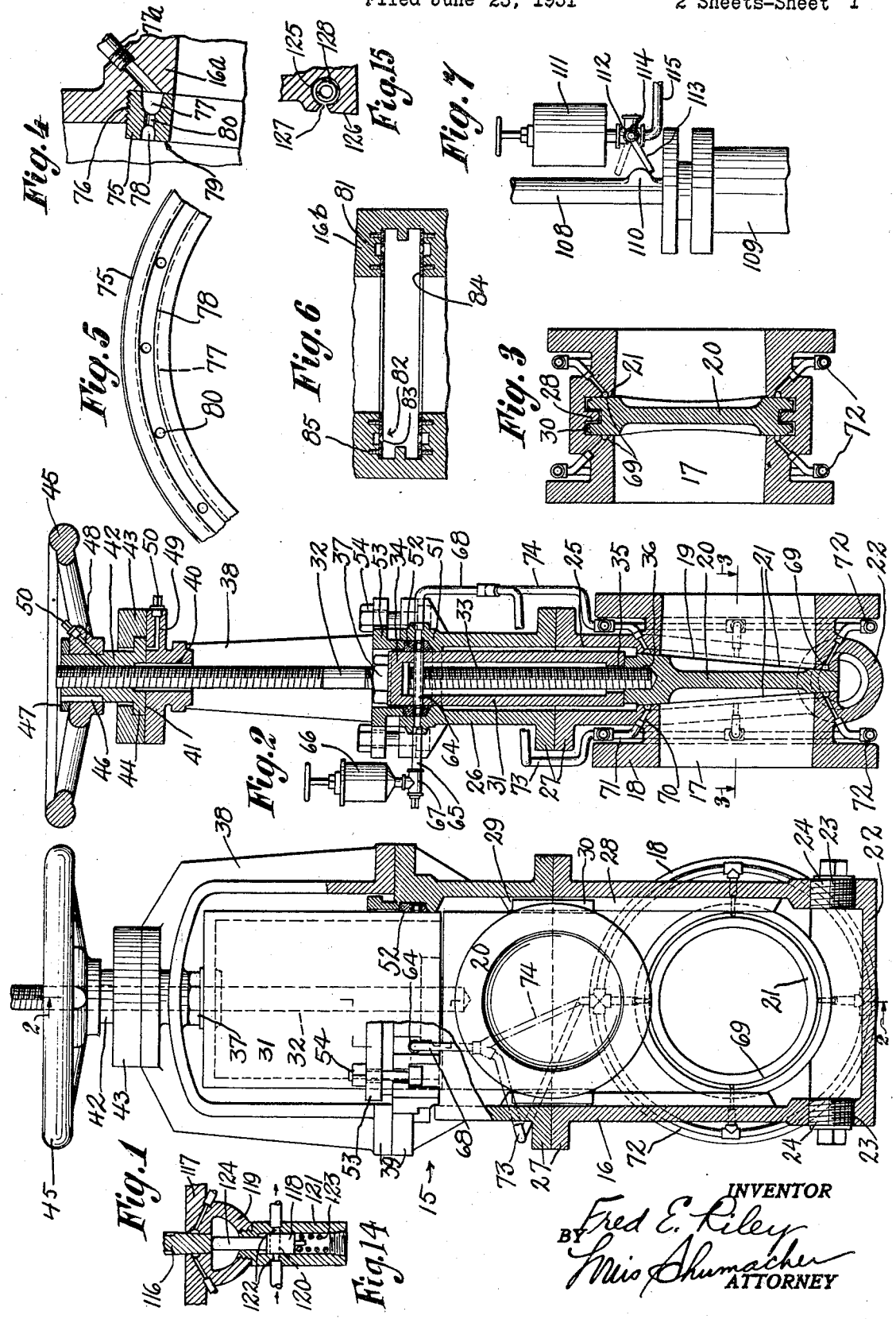
INVENTOR
Fred E. Riley
BY
Mio Shumacher
ATTORNEY Feb. 6, 1934.  F. E. RILEY  1,946,235
LUBRICATED VALVE AND CONTROL SYSTEM
Filed June 23, 1931   2 Sheets-Sheet 2
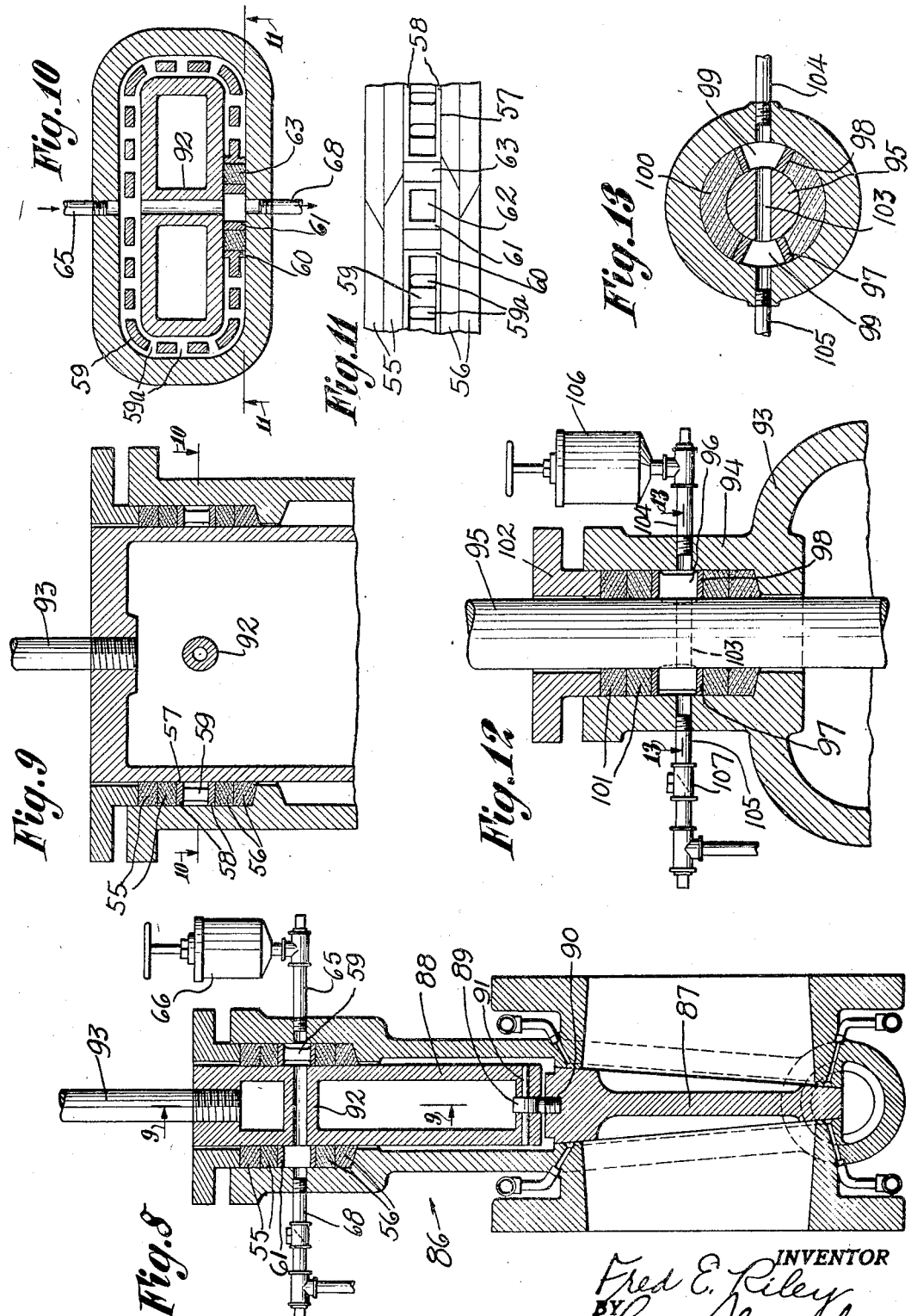

Patented Feb. 6, 1934

1,946,235

UNITED STATES PATENT OFFICE

1,946,235

LUBRICATED VALVE AND CONTROL SYSTEM

Fred E. Riley, Livermore Falls, Maine

Application June 23, 1931. Serial No. 546,203

13 Claims. (Cl. 251—61)

This invention relates to lubricated valves and lubricant controls therefor.

One object of this invention is to provide a lubricated valve having improved means for cutting off the supply of lubricant when the valve is open, and for causing a feed of lubricant only when the valve is fully closed and when the valve is almost closed or just beginning to open. More generally, the invention contemplates the provision of improved means for feeding lubricant at such time as it will be most effective, and with a minimum waste of the lubricant or contamination of products passing through the valve.

Another object of the invention is to construct a valve wherein an improved unitary source supplies lubricant to the valve seat and to the means for operating the valve. Otherwise stated, improved means is provided for furnishing lubricant intermittently to the valve and continuously to the means for operating the valve. It is also an object to arrange in an improved manner the means for lubricating the valve operating means, whether in connection with a valve stem or a valve extension, particularly the latter.

Other objects are to furnish improved means for distributing lubricant to the seating surface of the valve; an improved renewable seat for the valve; an improved cleanout for the valve casing; an improved piping system for distribution of the lubricant; and an improved mounting and coordination of the valve and associated parts.

A further object of the invention is the provision of a valve structure having relatively few and simple parts, and which is inexpensive to manufacture and assemble, rugged, durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a vertical view with parts removed and in section to show an embodiment of the invention in open position.

Fig. 2 is a vertical sectional view taken on broken line 2—2 of Fig. 1, but showing the closed position.

Fig. 3 is a horizontal sectional view taken on line 3—3 of Fig. 2.

Fig. 4 is a fragmentary sectional view of a renewable seat and associated lubricating means.

Fig. 5 is a fragmentary face view of the seat.

Fig. 6 is a fragmentary transverse sectional view of a valve casing showing a modified seat and lubricating structure.

Fig. 7 is a fragmentary view in elevation showing a modified form of lubricant control.

Fig. 8 is an enlarged view in vertical section showing a modified form of the invention.

Fig. 9 is a fragmentary enlarged sectional view showing the lubricant cage, taken on the line 9—9 of Fig. 8.

Fig. 10 is a horizontal sectional view taken on line 10—10 of Fig. 9.

Fig. 11 is a fragmentary face view of the lubricant cage and associated packing.

Fig. 12 is a fragmentary vertical sectional view of the invention as applied to a bonnet valve.

Fig. 13 is a transverse sectional view taken on line 13—13 of Fig. 12.

Fig. 14 is a fragmentary vertical sectional view of a further modification of the lubricant control.

Fig. 15 is a fragmentary sectional view of a further modification of the valve seating surface showing lubricant retaining means.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention. This application is in part a continuation of application Serial No. 546,204, filed on the same date herewith.

This invention is particularly adapted for valves that are used in the transmission of fluids carrying solid materials, and in the transmission of fluids or gases bearing impurities therein, as, for example, coke oven gas. Such solid materials or impurities necessitate that the valve seating surface be carefully lubricated, to avoid the deleterious effects of the solids, and to assure proper closing of the valve without undue wear. It is also desirable in such cases to effect an even distributed feed of the lubricant, as the deposition of solids may tend to interfere with a uniform lubrication of the seating surface. In fact, it is preferable to so arrange the lubricating system as to assure an adequate supply and a uniform pressure feed continuously along the seating surface not only by reason of possible clogging of portions of the lubricating groove or passage by deposited material, but to break through and remove such deposit and facilitate elimination thereof from the seating surface. Hence it is desirable that a force feed of the lubricant shall begin before the valve or gate is in fully or partially closed position and in snug contact with the seating surface. On the other hand, it is desirable that while the valve is open, the supply of lubricant shall be cut off to prevent loss of lubricant or contamination thereby of the products passing through the valve. The present invention fulfills these requisites.

Referring in detail to the drawings, 15 denotes a device embodying the invention. The same may include any suitable casing 16 which may be made in one or more pieces, and may include a through passage 17, with fastening means such as flanges 18 at the ends thereof. Intersecting the passage 17 is any passage 19 for a valve or gate 20, which terms may be interchangeably used herein. The latter may be of any desired form or wedge shaped as shown, hence the passage 19 may have one or more seats 21 of corresponding inclination for uniformly engaging the gate.

At the lower portion of the casing 16 is an extension pocket or chamber 22 which may be in the plane of the gate passage 19 and may be in direct communication therewith. This extension chamber serves to collect deposits, which may be removed through one or both of the openings 23 which may be closed by the alined plugs 24.

Formed on the upper portion of the casing 16 is a housing portion 25 with which may be connected a casing extension 26 in any suitable manner, as by flanges 27. This extension casing may be of uniform size with the portion 25 and in alinement with the gate passage 19, but of somewhat larger cross section than the latter. Extending centrally along the edge walls of the elements 25, 26 are alined guides 28, 29 respectively. The gate 20 may have means such as pairs of flanges 30 slidable along said guides for maintaining the gate in a central plane of movement.

Connected to the gate 20 is any means for operating the same, which means may include a gate extension 31. The latter may be of any required form, as, for instance, of rectangular or other regular shape, and as large or preferably larger than the maximum cross sectional area of the gate. The extension may also be considered as a stem for the gate or valve, and vice versa. A sufficient clearance may be provided between the gate and casing extension.

One manner of operating the gate 20 may consist in the provision of a stem 32 having a threaded portion 33, passed or screwed through an upper wall portion 34 of the hollow gate extension, and passing through the latter including the hole 35 in the lower end thereof for engagement with the gate at 36. In this manner the gate and its extension may be rigidly interconnected, the same having a uniform bearing surface therebetween. A lock nut 37 on the stem may serve to tighten the engagement of the parts.

Mounted on the casing extension 26 is a support or yoke 38 secured thereto at flanges 39. This yoke may have an opening 40 through which the stem passes, and a uniform seating surface 41 about the opening. Any suitable means may cooperate for causing movement of the stem, as, for example, a sleeve 42 threaded on the upper portion of the stem and seated on the surface 41. A collar 43 engageable over a shoulder 44 of the sleeve serves to rotatably retain the sleeve in position. Mounted on the sleeve is a hand wheel 45, keyed thereto at 46 and further locked thereon by a tight ring or nut 47.

For lubricating the sleeve 42, a lubricant passage 48 may be provided passing through the hub of the handwheel and the sleeve 42 into communication with the thread thereof. A lubricant passage 49 may communicate through the yoke with the seat 41. Lubricant supply devices or cups 50 may be connected to the passages 48 and 49.

For sealing the casing at the gate extension packing means may be provided between the latter and the end of the casing extension. For this purpose the casing extension may have a packing box portion 51 for containing packing such as 52 under the pressure of a gland means 53 that is actuated by bolts 54. Since the packing uniformly contacts the gate stem or extension all around, the casing is adequately sealed in any position of the gate.

To facilitate the movement of the gate extension through the packing 52 and to avoid undue wear on the latter especially in view of the long travel of the gate extension, lubricating means are provided so arranged that the lubricant will be positively fed directly or indirectly to the packing. Accordingly I may provide a lubricant distributing means as particularly shown in Figs. 9 to 12. The packing may consist of upper rings or layers 55 and lower rings or layers 56. Between these may be interposed a suitable channel means so arranged that the packing forms a closed passage therewith, except that the passage may communicate with the gate extension. The channel means may be in the nature of an I beam section 57 of substantially C form, the section having upper and lower flanges 58, a web 59, and transverse end flanges 60. Thus the member 57 fits in the box 51 but with mechanical clearance with the gate extension 31. The packing rings are compressed against the opposite flanges 58 and snugly contact the casing and gate extension thereby forming a substantially fluidtight lubricant channel. Formed in the web 59 are a plurality of openings 59a for intercommunicating the spaces on the opposite sides of the web. Between the end flanges 60 is disposed a lubricant cut off fitting or block 61 having an opening 62 therein, and packing 63 between the block and the end flanges. The block 61, together with the packing extending all around it, provides a cut off for the lubricant, as hereinafter described; and thus a uniform continuous support is provided for the packing rings 55, 56.

Extending through the gate extension is a tubular element 64 which is tightly engaged at its ends with the walls of the extension and which may be offset to one side of the stem 32 to clear the same. This element is adapted to communicate with a cut off block such as 61 which is necessarily correspondingly offset, and the distributing member 57 arranged to suit. However, the tubular element may also be centrally arranged as shown in Fig. 8, hereinafter described, the principle of operation of the grease cage being in each case the same. Communicating with the grease cage is a pipe 65 which connects with a source 66 of lubricant supply under pressure, and any conventional check valve 67 being interposed. Thus the lubricant is at all times free to enter the grease cage and to travel along the member 57 and through the openings 59a to contact the gate extension, so that, as the latter is moved up and down it will be thoroughly lubricated. In fact, by making the lubricant pressure sufficiently high, some of the lubricant may work into the packing rings independently of any operation of the valve, and of course the packing rings may be made of any suitable materials, porous or fluidtight.

For lubricating the valve seat, a pipe 68 may be connected to the casing extension to communicate with the cut off means 61. Hence when the valve is closed, the cut off means is in communication with the tubular means 64 so that lubricant may readily flow to the valve seat, but when the valve is open the gate extension is raised and hence the cut off means 61 is out of communication with the tubular means 64 so that the lubricant supply is cut off. By making the cut off means 61 of a desired length in the direction of travel of the gate extension, the supply of lubricant may be continued for any desired condition. However, with a wedge type gate, it will ordinarily suffice that the lubricant be supplied as the valve approaches closing position, and just as it begins receding from closed position. It is advantageous that the lubricant be supplied before the valve closes so as to assure an adequate flow and distribution, and likewise the continued supply of lubricant in the closed position assures penetration of any deposit in the lubricating groove and subsequent easy removal of such deposit as the valve begins to open. But the flow of lubricant during opening of the valve also assures a thorough greasing of the valve so as to protect the surface thereof, as well as the washing out of the grooves after the pressure exerted by the gate on the seating surface has been released.

The seating surfaces 21 of the casing may have continuous grooves 69 formed therein, with which communicate a plurality of passages 70. These passages also communicate with a conduit or main located in any suitable position. Thus tubes 71 may be connected with a circular main 72, one on each side of the valve, and preferably external of the casing. These mains communicate by branch pipes 73, 74 with the pipe 68. While various piping systems may be used, the one herein shown tends to simplify the connections.

In Figs. 4 and 5 is shown a renewable seat for the gate, this seat coacting in a suitable manner to provide an improved continuous feed line of lubricant. The seat may be in the nature of a ring 75 threaded into the casing 16a at 76, and having a relatively large groove 77 at its inner face closed with the casing wall, and a small groove 78 at the seat 79, these grooves being interconnected by openings 80. A lubricant supply line 77a communicates with the groove 77.

In Fig. 6 is shown a modification of the renewable seat, the casing 16b having large circular grooves 81 which may be partially covered by plate means 82 to provide an undercut effect. Thus the plate means at each side of the casing may consist of a single plate with openings or slots 83 therein, or a pair of ring plates which may afford a continuous circular opening 83, smaller than the groove 81. Thus an adequate well distributed feed of lubricant is assured to the gate seats 84 which may be afforded by the surfaces of the plates. The openings 83 may have beveled edges for a smooth movement of the gate and to cause the lubricant to have access to any deposit at the edge of the opening when the gate is fully closed. The plate means may be connected, for instance, by countersunk screws 85, and in this arrangement, no machining to provide a gate seat need be required.

It may be noted that the grooves such as 77 and 81 or the like may constitute lubricant reservoirs for the valve seat, and if the lubricant is in the nature of a relatively thick grease, such lubricant will tend to remain in the reservoir until pressure is exerted thereon. The size of the outlet openings for such reservoir may be sufficiently small to assure retention of lubricant, but they may also be of relatively large area. Since, in any case, the flow is small, the effect of friction is largely eliminated, or high pressure or large inlet pipes may be employed. The grease compartment for the gate extension may also constitute a grease reservoir for that purpose, or for direct replenishment of grease at the valve seat reservoir.

In Fig. 8 is shown a modification of the invention which may with few differences be substantially the same as that hereinbefore shown. This modified device 86 is provided with a gate 87 having a supporting or operating means such as the gate extension 88 to which the gate may be movably or pivotally connected, as by means of a shackle bolt 89 connected to the gate at 90 and mounted on the extension by a pin 91. This permits a degree of play of the gate, within any limits of clearance of the casing, so as to facilitate the seating of the gate and the smearing of the lubricant over the seating surface. Pressure may also be brought to bear on the gate to assure a tight closure.

The means for communicating the cut off block 61 with the source of lubricant may include a central tubular portion 92 that may be integral with the gate extension. The stem 93 may terminate above the tubular portion 92.

In Figs. 12 and 13 is shown a modification of the invention wherein certain lubricating features hereinbefore disclosed may be co-ordinated directly with the stem of the valve, as, for example, in a bonnet valve. The latter may include a casing 93 having a stuffing box portion 94 through which is movable a stem 95. Partially surrounding the stem in the stuffing box is a lubricant chamber or reservoir 96, the same including oppositely related blocks 97, 98 having openings 99. Between these blocks may be placed a packing 100 of equal height with the blocks and overlying and underlying the blocks and packing 100 are packing rings 101 which are compressed by a gland 102 for sealing the stem with the casing. Communicating with the openings 99 of the blocks is a through opening 103 in the stem 95, and also the inlet and outlet pipes 104, 105 respectively. The former may communicate with a source 106 of lubricant supply under pressure, and the latter may have a check valve 107 and extend thence to any seating surface of the valve.

In Fig. 7 is shown a modification of the invention whereby an external control for the lubricant supply to the valve seating surface may be used. Thus a valve stem 108 extending from a valve casing 109 may have an actuator portion 110. A lubricant reservoir 111 which may be under pressure may have any outlet control valve 112 operated by an arm 113. A coil spring 114 or the like tends to close the valve, the arm 113 being then in the dotted line position. Now when the valve moves to closing position, the portion 110 may move the arm 113 downward to open the valve, so that a flow of lubricant may be supplied to the valve seating surface as through a pipe 115 when the valve approaches the closing position and while the valve remains closed.

Features of this invention may be used with any types of valves. In the drawings, it has been sought to show a practical embodiment of the invention but without limiting the invention thereto, the same being defined in the following claims.

Fig. 14 is an external lubricant control which may be operated by the valve and may be disposed at any convenient accessible point for that purpose. Specifically, the gate 116 shown in the closed position in a casing 117, may actuate a control valve 118 that may be located at a central point of the bottom clean out chamber 119 shown in Figs. 1 and 2. The control valve 118 may be of any suitable or plunger type having a passage 120 therethrough. This valve may be reciprocably mounted in a cylinder casing 121 connected to the cleanout chamber. In this casing are alined passages 122 adapted to communicate with the opening in the plunger valve. The latter may be normally actuated into an upward, closing position by a stiff expansion coil spring 123, in which case the valve opening 120 is out of communication with the passages 122. When or as the main valve 116 is closed, the latter may abut and depress a rod 124 connected to the plunger valve and extending through the cleanout chamber 119 and normally into the lower part of the passage of the main valve. When the latter is closed, the plunger valve is open to supply lubricant by any suitable connections to the valve seating surface or other points as desired. However, the flow of lubricant may begin before the gate 116 reaches fully closed position, especially if the opening 120 be elongated in cross section in the longitudinal direction of the plunger valve, as shown.

In Fig. 15 is shown a modification of the lubricant reservoir at the valve seating surface, the said reservoir being provided with mains for effectively retaining the lubricant therein to the degree that the lubricant may not flow therefrom except upon the application of a suitable pressure. This assures against waste of lubricant and also that there will always be a supply of lubricant at hand for immediate lubrication of the seating surface without loss of time incident to the slow flow of lubricant, which would otherwise be necessary. In this manner, also, a more uniform and adequate distribution of lubricant and within proper time limits is attained. The advantages attained result from the employment of a relatively large lubricant chamber 125 extending along the seating surface 126 and having a constricted outlet 127. The reservoir and outlet may, of course, be continuous and coextensive in length with the seat. Disposed within the reservoir is a suitable lubricant retaining means which may be porous or foraminous, with relation to the viscosity of the lubricant, and made of any suitable material such as felt, asbestos, perforated tubing or plate, although it may consist merely in a wire spiral 128 which occupies little space. The latter may extend continuously through the reservoir, and may have its adjacent coils in any suitable proximity to each other, while the diameter of the coils may be smaller than or practically as large as the reservoir. Such means may be inserted in any suitable manner and may be reliably retained by reason of the restricted outlet 127. It may also be sufficient in strength to resist any fibrous or other solid materials that may pass adjacent thereto.

I claim:

1. A device including a valve, a casing therefor, said valve and casing having seating surfaces, a stem means for operating the valve, and lubricating means for the seating surfaces, said lubricating means being opened by the stem means when the valve is closed and when the valve approaches the seating surface of the casing, said lubricating means being cut off by the stem means as the valve recedes from said seating surface.

2. A device including a valve, a casing therefor, said valve and casing having seating surfaces, a stem means for the valve movable therewith, and lubricating means for the seating surfaces, the stem means having an opening therein for opening and closing the lubricating means and being arranged for causing the lubricant to be supplied when the valve is substantially closed and also when the valve approaches closing position.

3. A device including a gate, a casing therefor, said gate and casing having seating surfaces, a gate extension connected to the gate, a series circuit for the seating surfaces and the gate extension and a unitary pressure means for supplying lubricant to the gate extension and to the seating surfaces through said series circuit.

4. A device including a valve, a casing therefor, said valve and casing having seating surfaces, a movable member for the valve, and a lubricant series circuit for supplying lubricant to the seating surfaces and to said member, the movable member having means for cutting off that portion of the series circuit that supplies lubricant to the seating surfaces so as to prevent the flow of lubricant thereto in the open position of the valve.

5. A device including a valve, a casing therefor, the valve and casing having seating surfaces, a lubricant reservoir in the casing, said valve having an extension extending through said reservoir so as to be lubricated thereby, and means for supplying lubricant to the seating surfaces, and opened and closed by the extension.

6. A device having movable means including a valve and valve extension, a casing for the valve, said valve and casing having seating surfaces, and lubricating means for the seating surfaces, the extension having a through opening adapted to form a passage for the lubricant and to control the flow of lubricant to the seating surfaces.

7. A device including a valve, a casing therefor, said valve and casing having seating surfaces, lubricating means therefor, said valve having an extension, a lubricant chamber for the extension, said extension extending through said lubricant chamber so as to be lubricated thereby, spaced inlet and outlet connections for said chamber, a source of lubricant connected with the inlet, said extension having a portion adapted to cause intercommunication of the inlet and outlet, and means connecting the outlet with the lubricating means for the seating surface.

8. A device including a valve, a casing therefor, the valve and casing having seating surfaces and means for supplying lubricant to said seating surfaces, said means including a valve means having a plurality of elements one of which is movable with respect to another for cutting off the lubricant supply while the valve is moving between open and closed positions, the movable element being an extension of the valve and being associated with the valve whereby said extension can be removed without affecting the valve in the closed position of the latter.

9. A device including a valve, a casing, the valve and casing having complementary seating surfaces, a movable member for the valve, said member and casing having complementary seating surfaces, means for supplying lubricant to the first and second mentioned seating surfaces, including a lubricant passage at the first mentioned seating surfaces, and a lubricant channel at the second mentioned seating surfaces, and a source of lubricant connected to said channel, said member having an opening adapted for communication with the lubricant channel, and a conduit communicating with said passage and said opening so that the conduit is controlled by movement of said member.

10. A device including a valve, a casing, the valve and casing having complementary seating surfaces, a movable member for the valve, said member and casing having complementary seating surfaces, means for supplying lubricant to the first and second mentioned seating surfaces, including a lubricant passage at the first mentioned seating surfaces, and a lubricant channel at the second mentioned seating surfaces, said channel consisting of a frame element and packing on its opposite sides for sealing the channel, and a source of lubricant connected to said channel, said frame having an outlet opening, said member having an opening adapted for communication with said channel and movable into and out of registry with the outlet opening upon movement of said member, and a conduit connected to said passage and the opening of said frame.

11. A device including a valve, a casing therefor, said valve and casing having complementary seating surfaces, a stem means movable with the valve, and lubricating means for the seating surfaces opened by the stem means as the valve approaches its closing position, and closed by the stem means in the open position of the valve.

12. A device including a valve, a casing therefor, said valve and casing having complementary seating surfaces, a stem means movable with the valve, and lubricating means for the seating surfaces closed by the stem means as the valve recedes from closed position and maintained closed in open position of the valve.

13. A device including a casing, a valve, a hollow extension for the valve, said extension and valve having alined threaded portions, and a stem passing through the extension and having threaded engagement with the threaded portions of the valve and extension, whereby the extension is removable without affecting the closed position of the valve.

FRED E. RILEY.